Figure 1:
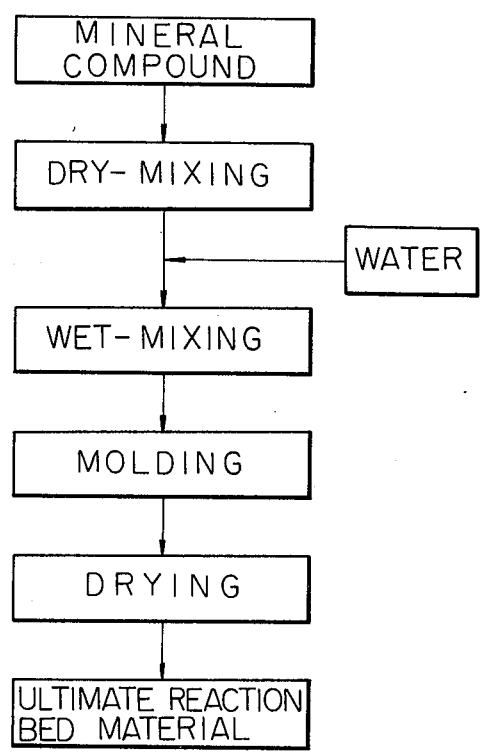

United States Patent [19]
Nishino et al.

[11] 3,932,578
[45] Jan. 13, 1976

[54] METHOD OF MAKING REACTION BED MATERIAL FOR ARTIFICIAL MINERAL WATER PRODUCTION

[75] Inventors: Atsushi Nishino; Hiroshi Kumano; Kazunori Sonetaka, all of Osaka, Japan

[73] Assignee: Matsushita Electric Industrial Co., Limited, Kadoma, Japan

[22] Filed: July 13, 1973

[21] Appl. No.: 378,871

[30] Foreign Application Priority Data
July 14, 1972  Japan................................ 47-71008
July 14, 1972  Japan................................ 47-71009
Sept. 21, 1972 Japan................................ 47-95364
Sept. 22, 1972 Japan................................ 47-95578

[52] U.S. Cl. ................. 264/331; 106/119; 210/506; 210/DIG. 1; 264/330; 423/161
[51] Int. Cl.² .......................................... B29B 1/04
[58] Field of Search ............ 106/119, 122; 210/504, 210/506, DIG. 1; 264/15, 330, 331; 423/105, 161, 138

[56] References Cited
UNITED STATES PATENTS

| | | | |
|---|---|---|---|
| 1,052,440 | 2/1913 | Hagg | 210/504 |
| 2,455,813 | 12/1948 | Schoenlaub | 423/161 X |
| 2,650,084 | 8/1953 | White | 264/15 UX |
| 2,902,378 | 9/1959 | Toulmin | 106/119 X |
| 3,304,154 | 2/1967 | Kiouzes-Pezas | 264/15 X |
| 3,402,017 | 9/1968 | Ruiz | 423/161 X |

OTHER PUBLICATIONS

Pough, A Field Guide to Rocks and Minerals, Houghton Mifflin Co., Boston, 1960, pp. 157 to 159 and 162 to 165.
Lange's Handbook of Chemistry, Handbook Publishers, Inc., Sandusky, Ohio, 1946, p. 118.

*Primary Examiner*—Leland A. Sebastian

[57] ABSTRACT

A molded material comprising $CaCO_3$ and/or $MgCO_3$ is made and used as a reaction bed through which carbonated water is run to make mineral water.

2 Claims, 2 Drawing Figures

METHOD OF MAKING REACTION BED MATERIAL FOR ARTIFICIAL MINERAL WATER PRODUCTION

This invention generally relates to artificial mineral water and particularly to a reaction bed material for use in the production of artificial mineral water and to a method for manufacturing the material.

Various methods for artificially producing mineral water have been recently developed. Such methods include those simply adding to service water a water-soluble salt such as acid calcium phosphate (CaH($PO_4$)$_2$.$H_2O$), magnesium sulfate ($MgSO_4$.$7H_2O$), sodium chloride (NaCl), calcium chloride ($CaCl_2$.$2H_2O$), magnesium chloride ($MgCl_2$.$6H_2O$), or sodium bicarbonate ($NaHCO_3$). Such methods are useful for producing a large amount of mineral water at one time, but are not suitable for intermittently supplying only a small amount of mineral water whenever required. Moreover, the mineral water obtained from such methods is permanently hard containing anions such as $SO_4^{--}$, $Cl^-$, and/or $PO_4^{--}$, which are considered to be harmful to the human body in excessive amounts. Accordingly, when the water-soluble salts are added to source water in a great amount, such addition results in an increase in the stoichiometrical amount of the undesirable anions. Moreover, natural mineral water generally contains calcium bicarbonate and/or magnesium bicarbonate as its main components, thus being different in composition from prior-art artificial mineral water.

It is an object of the present invention to provide a novel reaction bed material for use in the production of artificial mineral water.

It is a further object of the present invention to provide a reactionn bed material which comprises a water-insoluble metal carbonate or carbonates.

It is a still further object of the present invention to provide a reaction bed material which is capable of producing mineral water continuously or intermittently in a desired amount with use of service water, ion-exchanged water or distilled water.

It is another object of the present invention to provide a reaction bed material which is capable of producing mineral water having a composition similar to that of natural mineral water.

It is another object of the present invention to provide a reaction bed material which can be suitably used for the production of mineral water on either a large or a small scale.

It is another object of the present invention to provide a reaction bed material which is inexpensive and which can be easily produced, the mechanical strength of which can be changed as desired by controlling drying temperatures in the manufacturing process thereof.

It is another object of the invention to provide a method for the production of the reaction bed material of the nature as mentioned above.

The above objects are attained by a reaction bed material which comprises 40 ≦ $CaCO_3$ ≦ 100 mole %, and which may further comprises 0 < $MgCO_3$ ≦ 60 mole %. Furthermore, a carbonate or carbonates of manganese, iron, and/or zinc, or a hypogene rock which contains water-insoluble but acid-soluble compounds of Mn, Fe, Zn, K and/or Na may be added in an amount from more than 0 to less than 10 mole %. The reaction bed material can be obtained by mixing powdered metal carbonate or carbonates with water, granulating and molding the mixture in a suitable form, and drying the formed material to obtain the ultimate water-insoluble reaction bed material. In order to improve bonding properties of the carbonate powder to be granulated, a suitable water-soluble bonding material may be added to the mixture by preliminarily dissolving it in water, including starch, carboxymethyl cellulose, polyvinyl alcohol or gelatin. The molded material may be formed into granules or particles in one step, or may be first formed into cakes or blocks and then, before or after drying, broken into particles.

Figure 2:
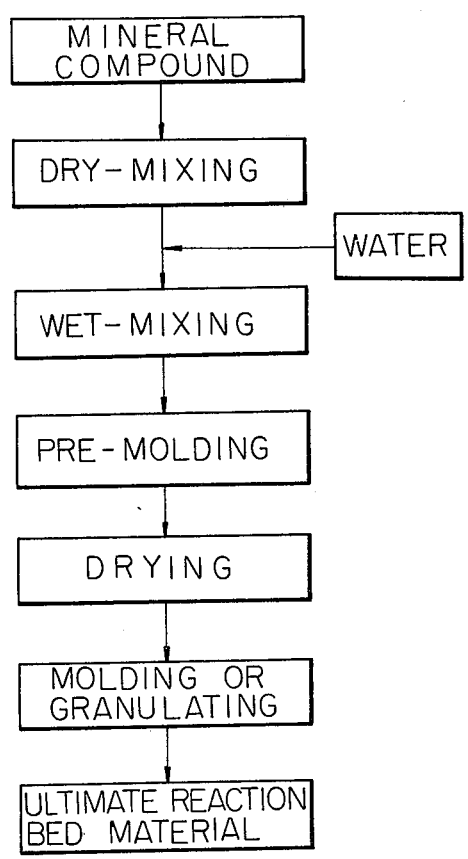

These and other objects and advantages of the present invention will become apparent from the following description takein in conjunction with the accompanying drawings, in which:

FIG. 1 is a block diagram illustrating sequential steps of producing a reaction bed material of the present invention; and FIG. 2 is a block diagram similar to FIG. 1 but illustrating more sequential steps.

Referring now to FIG. 1, powder of a water-insoluble mineral compound or compounds is subjected to dry-mixing for several minutes in a mixer such as a kneader. To the dry-mixed compound a suitable amount of water is added for wet-mixing with or without a bonding material. Then, the mixture is formed into suitable granular shapes under pressure by means of a molding machine. Alternatively, as shown in FIG. 2, the mixture may be first formed into cake-like blocks by means of a pre-molding machine and then formed into granules by crushing/granulating means. The thus obtained granules or particles are subjected to a drying treatment to obtain the ultimate reaction bed material. In this connection, where the molding material is first formed into blocks, drying may be effected before the crushing step. Water used for bonding the powder of carbonate compounds should be sterilized clean water and used in an amount of 13 – 45% by weight in the powder when water alone is used for bonding purposes. A water-soluble bonding material which is used together with water, carboxymethyl cellulose, starch, gelatin, or polyvinyl alcohol which are recognized as acceptable food additives should be used in an amount of 0.5 – 10% by weight in water, which in turn amounts to 20 – 50% by weight in the powder. In both cases, drying is carried out at a temperature of 0° to 890°C, preferably at a higher temperature with a lower bonding material content. Where the bonding material is employed along with water, the resultant reaction bed material has desirable surface properties with great mechanical strength. When the bonding material is incorporated into water in an amount less than 0.5% by weight, the reaction bed material obtained shows no substantial increase in mechanical strength as compared with that obtained with water alone. On the other hand, if the bonding material is used in an amount greater than 10% by weight, there arise problems in that wet-mixing becomes difficult, that the surface areas of the reaction bed material are reduced, and in that the taste of the obtained mineral water is spoiled. Accordingly, the amount of the water-soluble bonding material is preferably held within a range of 0.5 to 10% by weight in water.

As mentioned hereinbefore, the smaller the amount of the binder, the higher should the drying temperature be. The molded material which contains a suitably large amount of a binder may be dried or treated at room temperature or even in a freezing state, to give a sufficient mechanical strength thereto.

The reaction bed material of the present invention, for example, is used in the following manner when producing artificial mineral water. Source water from which impurities and solid foreign matter, if any, have been removed is mixed with carbon dioxide under pressure to obtain carbonated water. Then, the carbonated water is passed through a layer of the reaction bed material to produce mineral water. The reaction bed material of the present invention may be in the form of granules or crushed particles. The advantages accruing from such form of the reaction bed material are summarized as follows:

1. By using a granular or crushed reaction bed material, it is unnecessary to pre-coat it on the surface of a filter cloth as is the case when a powdery material is used. Moreover, a constant amount of the mineral component can easily be dissolved when granular or crushed material is used.

2. With a powdered carbonate, a filter cloth is apt to clog causing filtration stoppages, whereas, the granular carbonate is completely free from such problems.

3. The use of granular carbonate permits easy formation of bicarbonate only in a short time with the use of carbonated water.

4. There is hardly a difference in the specific surface area between powdery carbonate and granular carbonate when determined in accordance with a B. E. T. method. That is, the specific surface area of powdery carbonate is 32 m$^2$/g, and that of granular carbonate of the present invention 30 m$^2$/g.

5. The use of granular carbonate permits the total acidity of the artificial mineral water to be reduced and the resultant mineral water has a suitable pH value (higher than 6). Moreover, the artificial mineral water of the invention is temporarily hard water.

In general, natural mineral water contains $Ca(HCO_3)_2$ and/or $Mg(HCO_3)_2$ as its main components. The metal carbonate being an important raw material for artificially producing mineral water, will be discussed hereinafter.

The metal carbonate raw material is mainly composed of $CaCO_3$ and $MgCO_3$. Furthermore, $MnCO_3$, $FeCO_3$ and $ZnCO_3$ may be added to the just mentioned carbonate raw material. In this connection, carbonates containing Mn, Fe and/or Zn should be added in amounts within a certain range. However, Mn, Fe and/or Zn are not necessarily mixed with the main raw materials as carbonates, and thus hypogene rocks which contain water-insoluble but acid-soluble Mn, Fe, Zn, K, and Na compounds may be used.

When calcium carbonate is used in an amount from 40, inclusive, to less than 100 mole %, the molded filter material has sufficient mechanical strength. The raw material which contains calcium carbonate within the range defined above can be hardened at temperatures between room temperature and 850°C. If treated at temperatures above 850°C, the mechanical strength of the resultant filter material increases. However, if the raw material contains calcium carbonate in an amount less than 40 mole % to increase the percentage of other carbonates which easily yield to transformation, it becomes difficult to treat the molded material at high temperatures. Therefore, calcium carbonate should be present in the starting raw material in an amount of 40 mole % or more.

It is desirable to use magnesium carbonate in amounts of more than 0 and less than 60 mole % to ensure mechanical strength and good molding characteristics of the reaction bed material. That is, when mainly $CaCO_3$ is used as a raw or starting carbonate material, heat is generated during the molding step under pressure resulting in difficulty to obtain extremely small-size granules or particles. However, if $MgCO_3$ is added to $CaCO_3$ in a suitable amount, the granules or particles may be reduced in size. That is, a particle size of 3 mm $\phi$ is obtained by mixing 90 – 95 mole % of $CaCO_3$ with 5 – 10 mole % of $MgCO_3$; 1 mm $\phi$ by mixing 60 – 70 mole % of $CaCO_3$ with 30 – 40 mole % of $MgCO_3$; and 0.5 mm $\phi$ by mixing 40 – 50 mole % of $CaCO_3$ with 50 – 60 mole % of $MgCO_3$. By using $MgCO_3$ in a suitable amount, the molding can be easily carried out with reduced heat generation and without causing hardening of the material being molded in the course of the molding process. Accordingly, the use of a suitable amount of $MgCO_3$ permits a continuous and uninterrupted molding operation. Moreover, when $MgCO_3$ is used together with $CaCO_3$, hardening of the molded material can be carried out at temperatures from room temperature to 500°C. The mechanical strength of the $MgCO_3$-containing reaction bed material is as high as that of $CaCO_3$ alone, even when hardening is carried out at such low tempertures.

If $MgCO_3$ is incorporated in amounts greater than 60 mole %, disadvantageously long hardening times are required, resulting in high production costs, although the moldings have an improved mechanical strength.

The following Examples will illustrate the invention in detail.

EXAMPLE I

Preparation of a reaction bed having a granular size of 3 mm $\phi$:

5,000 g of $CaCO_3$ was placed in a kneader for agitation in a dry state for 5 min. 2,200 g of water was added to the material, which was then transferred to another kneader for wet-mixing for 10 min. The mixture was then molded and dried to obtain pellets having a diameter of 3 mm at a yield of 95% by weight of the starting material.

EXAMPLE II 5,000 g of $CaCO_3$ was placed in a kneader for dry-mixing for 5 min. 2,100 g of a binder mixture consisting of 98% by weight of water and the balance of carboxymethyl cellulose was added to the dry-mixed starting material which had been transferred into another kneader. The mixture was thoroughly agitated in the kneader for 10 min. Then, the mixture was molded and dried to obtain pellets having a diameter of 3 mm, at a yield of 97% by weight of the starting material.

The pellets of Examples I and II did not break when immersed in water for a long period of time. Moreover, when the pellets were used as a reaction bed material supported by a filter cloth, artificial mineral water was readily obtained simply by passing carbonated water therethrough, without causing clogging of the filter cloth.

EXAMPLE III 5,000 g of a starting material was placed in a kneader for dry-mixing for 5 min. The dry-mixed starting material was transferred to another kneader with 2,600 g of water added for wet-mixing for 10 min. Then, the mixture was molded under pressure to obtain a wet molding of a suitable shape. Then, a part of the water-containing molding was broken into granules which were dried to obtain dry granules at a yield of 85% by weight of the starting material. The other part of the wet molding was first dried and the dried molding was subjected to crushing by means of a crusher and irregularly sized granules were obtained at a yield of 75% by weight of the starting material.

While only certain details of the present invention, including its principles and resultant effects, have been described in the foregoing, it should be understood that the present invention is not limited to the particular details described since modifications and variations may be made to the reaction bed material of the invention by those skilled in the art without departing from the scope of the invention as defined in the appended claims. Accordingly, the appended claims are intended to cover all such equivalent variations and modifications as fall within the scope of the present invention.

What is claimed is:
1. A method of producing a molded bed material for use in the production of artifical mineral water comprising the steps of: mixing a mineral source powder comprising 40 to 100 mole % of magnesium carbonate with an aqueous solution of a bonding material permissible as a food additive selected from the group consisting of carboxymethyl cellulose, starch, gelatin and polyvinyl alcohol in an amount of 20 to 50% by weight of said powder, the concentration of said solution being from 0.5 to 10% by weight; kneading the resulting wet mixture; molding the kneaded mixture under pressure into pellets; and drying said pellets at a temperature between room temperature and 850°C.
2. A method as claimed in claim 1, wherein said carbonate source powder further comprises a material selected from the group consisting of $MnCO_3$, $FeCO_3$, $ZnCO_3$, and the mixture thereof in an amount up to 10 mole %.

* * * * *